(12) United States Patent
Wallash et al.

(10) Patent No.: US 8,004,795 B2
(45) Date of Patent: Aug. 23, 2011

(54) MAGNETIC HEAD DESIGN HAVING REDUCED SUSCEPTIBILITY TO ELECTROSTATIC DISCHARGE FROM MEDIA SURFACES

(75) Inventors: Albert John Wallash, Morgan Hill, CA (US); Hong Zhu, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 908 days.

(21) Appl. No.: 12/005,591

(22) Filed: Dec. 26, 2007

(65) Prior Publication Data

US 2009/0168262 A1 Jul. 2, 2009

(51) Int. Cl.
*G11B 5/33* (2006.01)
(52) U.S. Cl. .................................. 360/125.72
(58) Field of Classification Search ............. 360/125.72, 360/125.58, 125.75, 122, 125.01, 125.24, 360/125.43, 125.39, 125.66, 125.65, 323; 29/603.14, 603.07
See application file for complete search history.

(56) References Cited

U.S. PATENT DOCUMENTS

| | | | |
|---|---|---|---|
| 5,654,850 A | 8/1997 | Ganapathi et al. | |
| 6,084,743 A | 7/2000 | Comstock et al. | |
| 6,219,206 B1 | 4/2001 | Odai et al. | |
| 6,252,741 B1 | 6/2001 | Ahn | |
| 6,641,939 B1 | 11/2003 | Lee et al. | |
| 6,822,816 B2 | 11/2004 | Dakroub | |
| 7,031,109 B1 | 4/2006 | Granstrom et al. | |
| 7,199,982 B2 | 4/2007 | Suk | |
| 7,248,455 B2 * | 7/2007 | Brodsky et al. | 361/220 |
| 7,316,023 B2 * | 1/2008 | Kim et al. | 720/604 |
| 7,369,364 B2 * | 5/2008 | Jang et al. | 360/234.5 |
| 7,885,034 B2 * | 2/2011 | Bosley et al. | 360/90 |
| 2003/0169539 A1 | 9/2003 | Zolla | |
| 2003/0219626 A1 | 11/2003 | Partee | |
| 2005/0095884 A1 * | 5/2005 | Brodsky et al. | 439/91 |
| 2005/0135011 A1 * | 6/2005 | Jang et al. | 360/234.5 |
| 2005/0174687 A1 | 8/2005 | Edelman et al. | |
| 2006/0092570 A1 | 5/2006 | Payne et al. | |
| 2006/0132985 A1 | 6/2006 | Ohtsu et al. | |

FOREIGN PATENT DOCUMENTS

JP 4137212 5/1992

OTHER PUBLICATIONS

Author unknown, Electrically dissapative alumina for recording head application, IBM disclosure document 453140, Jan. 2002.

* cited by examiner

*Primary Examiner* — Allen Cao
(74) *Attorney, Agent, or Firm* — D'Arcy H. Lorimer; Lorimer Labs (57) ABSTRACT

Methods and structures for the fabrication of a thin film, longitudinal and perpendicular recording heads are disclosed. The heads comprise a plurality of embedded static dissipative layers that extend a few nanometers from the air bearing surface. These extended layers are first to contact the magnetic media surface and drain any electric charge buildup before a damaging discharge occurs with read or write head components. The embedded static dissipative layers are particularly useful for use in heads utilizing thermal fly height control systems, which tend to increase the probability of damaging electrical discharge through critical head components.

19 Claims, 12 Drawing Sheets

Figure 12 ically, the invention relates to structures and methods for fabricating a thin film recording head having reduced sensitivity to electrical breakdown resulting from electrostatic discharge from media surfaces.

MAGNETIC HEAD DESIGN HAVING REDUCED SUSCEPTIBILITY TO ELECTROSTATIC DISCHARGE FROM MEDIA SURFACES

BACKGROUND OF THE INVENTION

1. Field of the Invention

This invention relates to structures and methods for fabricating thin film magnetic read and write heads. More specifically, the invention relates to structures and methods for fabricating a thin film recording head having reduced sensitivity to electrical breakdown resulting from electrostatic discharge from media surfaces.

2. Description of the Related Art

The extremely small dimensions of structures comprising the read and write components of today's hard disk drive thin film magnetic heads makes these heads susceptible to damage by electrostatic discharge sources. One important source is the disk media itself, where static charge potentials on the order of a few volts can damage a thin film head and the media surface if a voltage breakdown or electrical discharge occurs between the head and disk media. As fly heights decrease in response to demands for increased areal densities, a catastrophic discharge becomes more likely. The onrush of current produced by a discharge can damage both the sensitive thin film read devices as well as write devices in both longitudinal and perpendicular thin film heads. This problem is further exacerbated in heads having thermal fly height control (TFC), since the physical distortion of the thin film head produced during heating tends to extend the critical read and write structures toward the media disk, making them closer than the slider body and the nearest "lightening rods".

Disclosure in the art have suggested a number of potential solutions to solve this problem. In some cases, semi-conductive layers embedded in the thin film heads have been proposed. These layers, however, are typically flush with the air bearing surface, along with other layers such as magnetic pole layers and shield layers. They are therefore ineffective in draining charge from a media surface, as the discharge will more likely be attracted to the metallic pole layers or shield layers. If this occurs, device damage will occur with or without the semi-conductive layers. Other references have suggested the use of a coating applied over the ABS. The problem with this technique is that the coating impacts the very critical head to surface dimensions which are on the order of 5 to 10 nm currently, and may drop to a few nanometers in the future. Thus, the thin coating itself will breakdown, resulting in a damaging current discharge. It is also difficult to reliably produce coatings on the order of a few nanometers that can carry the required current without being damaged themselves. What is needed is a better method to protect thin film magnetic heads from voltage breakdown.

Figure 1:
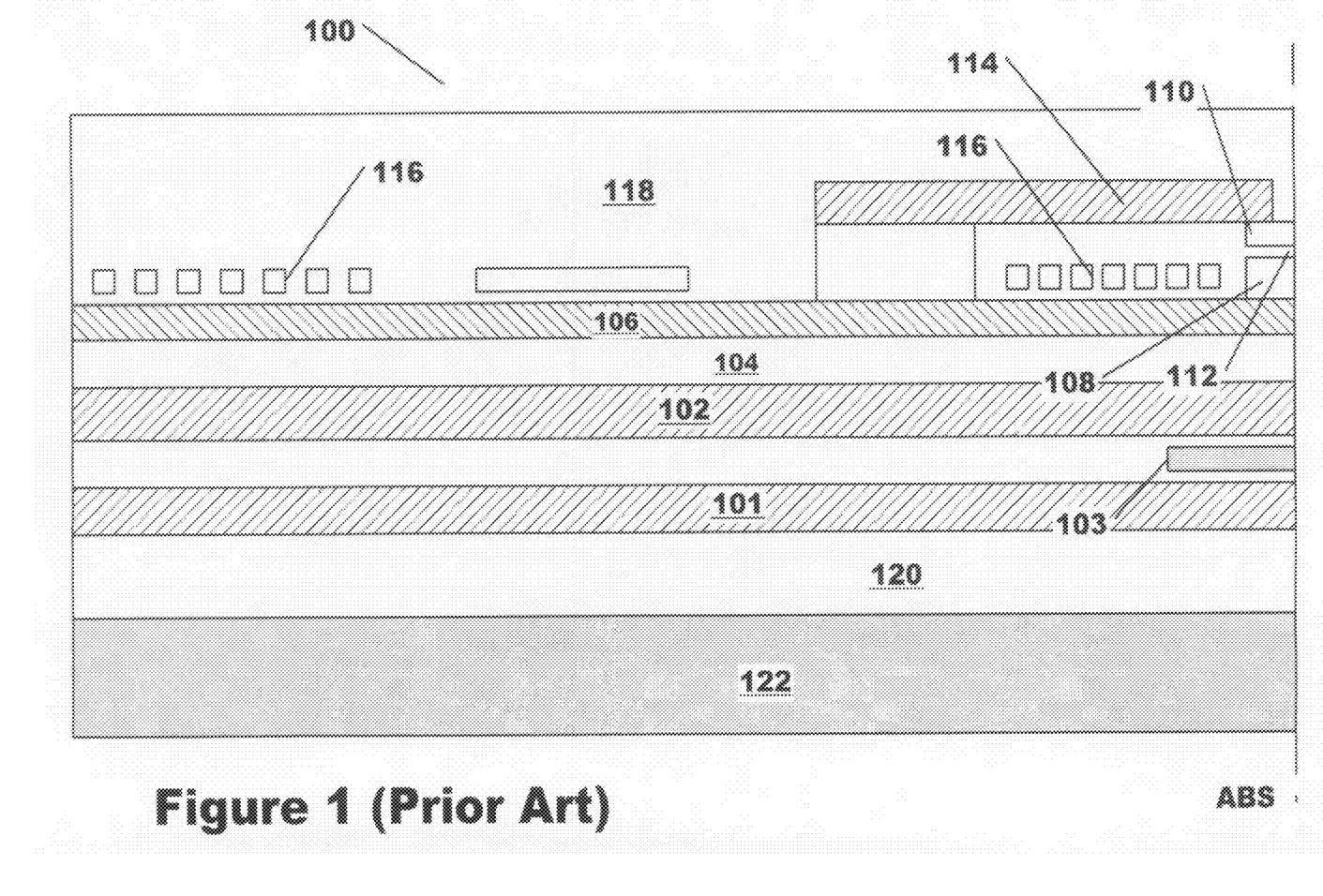
FIG. 1 (Prior Art) is a partial cross sectional view 100 of a typical thin film longitudinal head.

FIG. 1 (Prior Art) is a partial cross sectional view 100 of a typical thin film longitudinal head, wherein the write head comprises write gap 112 bounded by upper 110 and lower 108 pole tips. Upper pole tip 110 is in contact with upper return pole layer 114. Lower pole tip 108 is in contact with lower return pole layer 106. Lower return pole layer is separated from shield layer 102 by insulating layer 104. The coil is shown as structure 116, embedded in insulating layer 118, which may also be referred to as an overcoat layer. The read head comprises a MR (magneto-resistive) sensor 103 located between upper 102 and lower 101 shield layers. Shield layer 101 is supported by undercoat layer 120 and an AlTiC base layer 122.

Figure 2:
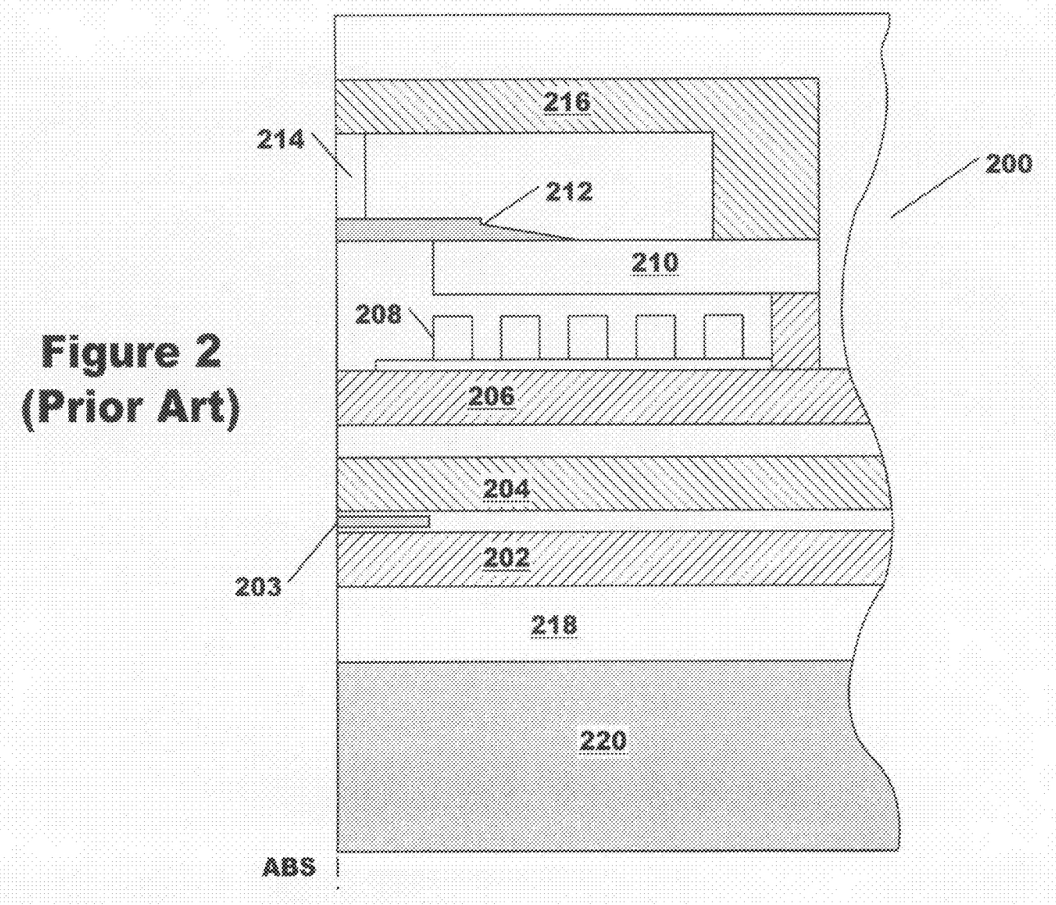
FIG. 2 (Prior Art) is a partial, cross sectional view 200 of a typical thin film perpendicular head.

FIG. 2 (Prior Art) is a partial, cross sectional view 200 of a typical thin film perpendicular head. The head comprises shield layers 202, 204, MR sensor 203, shaping layer 210, coil structure 208, main pole 212, lower return pole layer 206, wrap around shield 214, and upper return pole layer 216. Alternatively, structure 214 may also be a trailing shield. Shield layer 202 is supported by undercoat layer 218 and an AlTiC base layer 220. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

Figure 3:
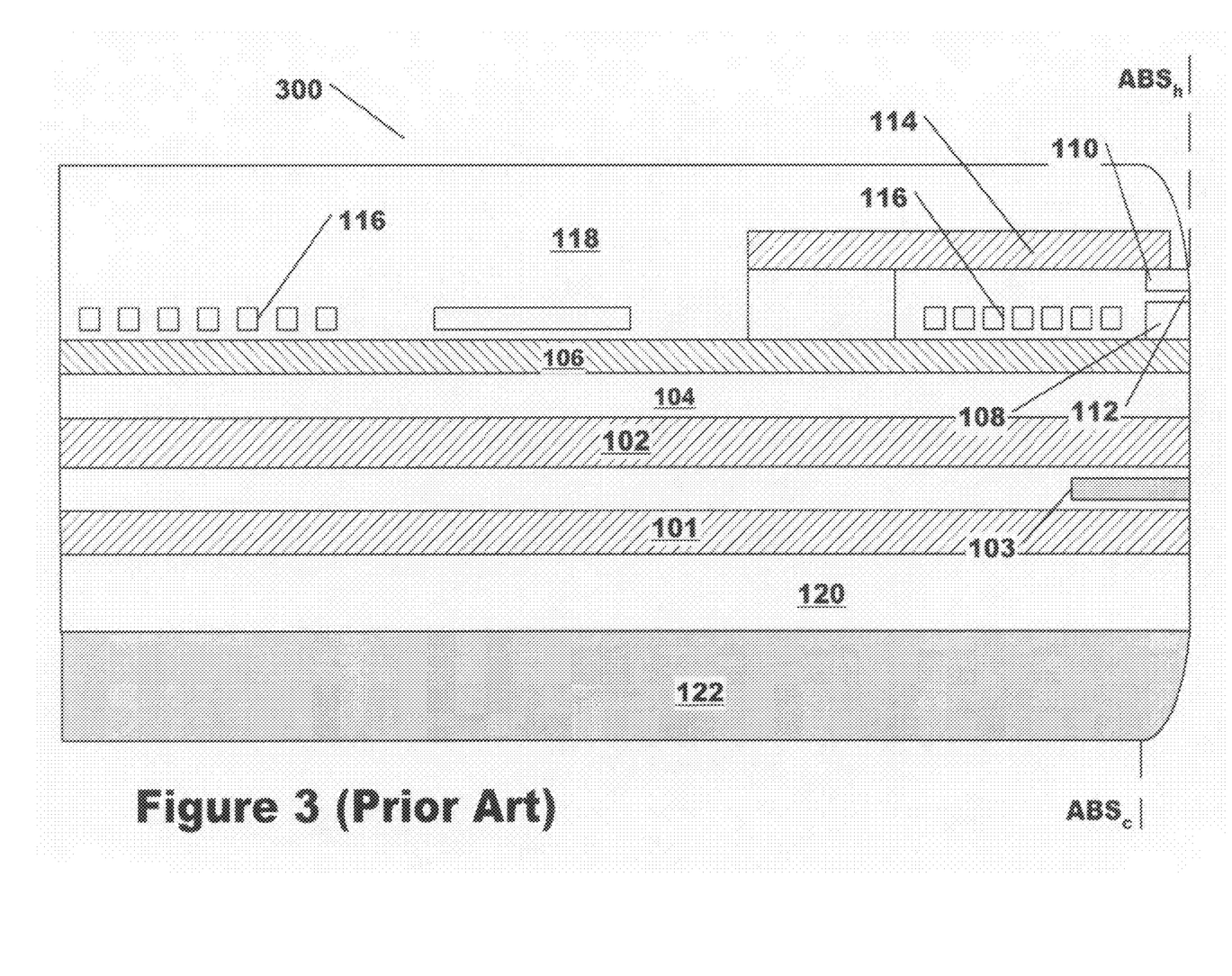
FIG. 3 (Prior Art) is a partial cross sectional view of a thin film longitudinal head undergoing thermal expansion during thermal fly height control.

FIG. 3 (Prior Art) is a partial cross sectional view 300 of a thin film longitudinal head undergoing thermal expansion during thermal fly height control. Thermal fly height control engages the use of heaters embedded within the thin film head structure (not shown) to cause distortion of the air bearing surface (ABS) when the head is heated. Thermal expansion of materials within the head cause the dynamic position of the ABS to move toward the disk surface. This alters the effective fly height of the head over the media disk surface. In FIG. 3, the dashed line marked $ABS_c$ indicates the position of the air bearing surface in an unheated condition (as in FIG. 1). The dashed line marked $ABS_h$ indicates the distorted position of the air bearing surface subsequent to heating. Unfortunately, the distortion produced by the thermal fly height control heaters make critical components such as shield layers 101, 102; sensor 103; pole tips 110, 108; and lower pole layer 106 more susceptible to damage by electrostatic discharge from the media disk surface.

Figure 4:
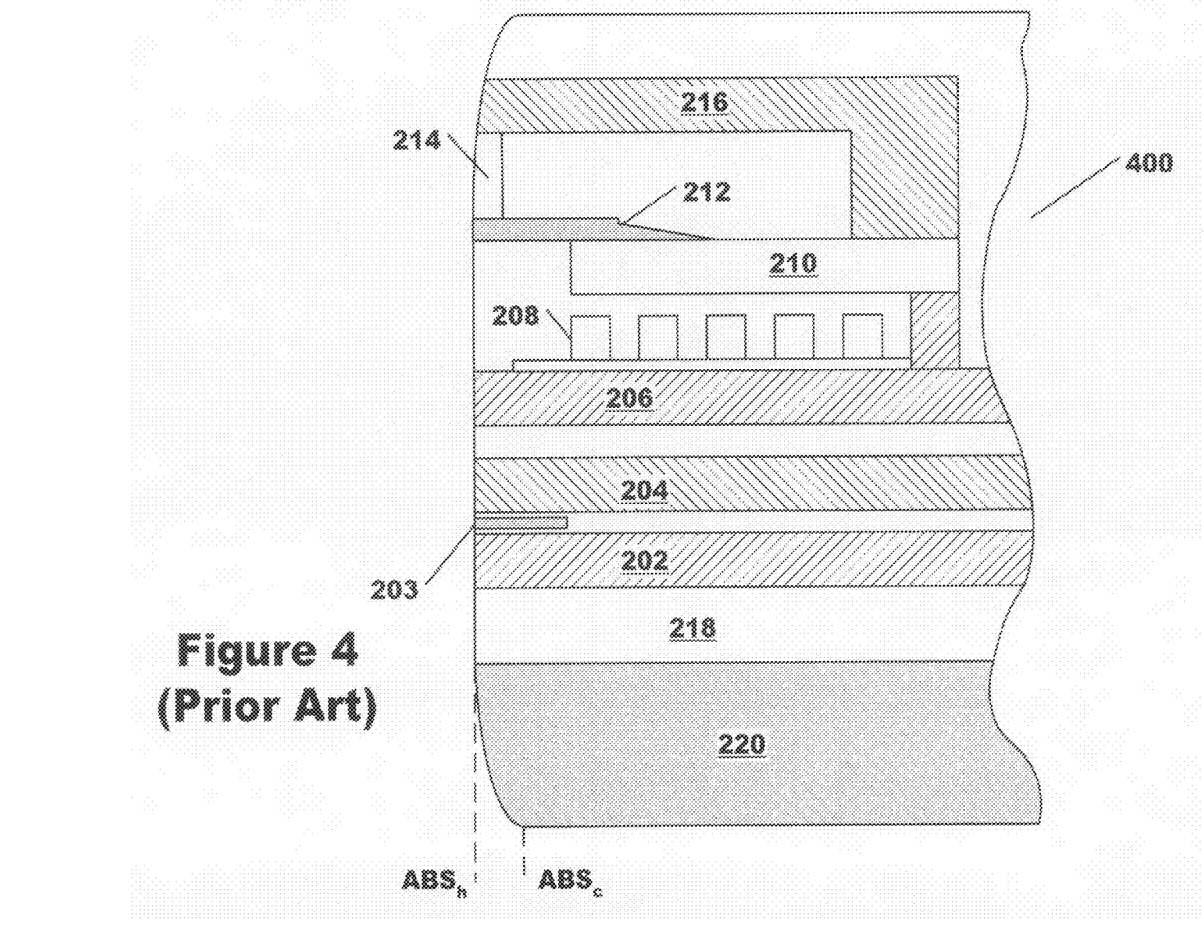
FIG. 4 (Prior Art) is a partial, cross sectional view of a thin film perpendicular head undergoing thermal expansion during thermal fly height control.

FIG. 4 (Prior Art) is a partial, cross sectional view 400 of a thin film perpendicular head undergoing thermal expansion during thermal fly height control. As was discussed with the longitudinal head of FIG. 3, distortion produced by the thermal fly height control heaters make critical components more susceptible to damage by electrostatic discharge from the media disk surface in this design as well.

SUMMARY OF THE INVENTION

It is an object of the present invention to provide a thin film magnetic head including a read head structure; a write head structure, the read head structure and the write head structure sharing a common air bearing surface; a first electrostatic dissipative layer, disposed between the read head structure and the write head structure, a portion of the first electrostatic layer extending beyond the air bearing surface by a distance D, distance D being between 1 and 5 nm.

It is another object of the present invention to provide a thin film magnetic head including a read head structure; a write head structure, the read head structure and the write head structure sharing a common air bearing surface; a first electrostatic dissipative layer, disposed between the read head structure and the write head structure, a portion of the first electrostatic layer extending beyond the air bearing surface by a distance D, distance D being between 1 and 5 nm. The structure further includes a second electrostatic dissipative layer, located such that the read head structure is disposed between the first electrostatic dissipative layer and the second electrostatic dissipative layer, a portion of the second electrostatic layer extending beyond the air bearing surface by distance D; and, a third electrostatic dissipative layer, located such that the write head structure is disposed between the first electrostatic dissipative layer and the third electrostatic dissipative layer, a portion of the third electrostatic layer extending beyond the air bearing surface by distance D.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

FIGS. 1-4 (Prior Art) have been discussed above in the Background section.

Figure 5:
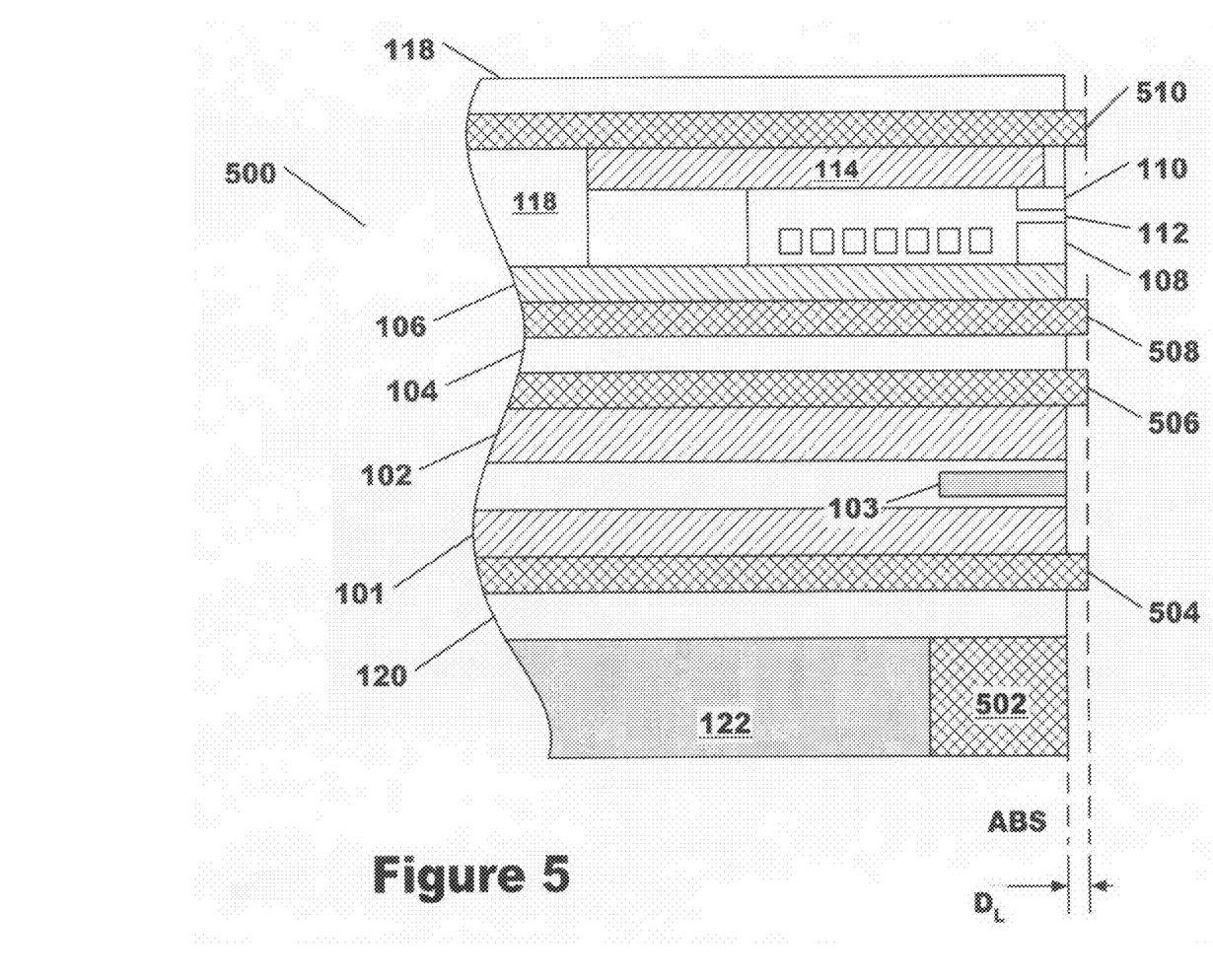
FIGS. 5, 6, and 7 are partial, cross section views of a thin film longitudinal heads having embedded electrostatic dissipation layers, in accordance with embodiments of the present invention.

FIG. 5 is a partial, cross section view 500 of a thin film longitudinal head having embedded electrostatic dissipation layers, in accordance with an embodiment of the present invention. Layers 502, 504, 506, 508, and 510 are electrostatic dissipative layers inserted within the longitudinal head structure to drain electrical charge from the storage media surface (not shown) in a controlled manner, thus reducing the electrical potential difference that leads to breakdown. Their purpose is to prevent rapid discharge of the electrical charge thorough sensitive components such as the MR read sensor 103 and shield layers 101, 102; or the write head components comprising upper pole tip 110, lower pole tip 108, and lower return pole layer 106. Typically, this discharge occurs if the head makes contact with (or is in extremely close to) the media disk surface. Electrostatic dissipative layers 502, 504, 506, and 510 have a resistivity between that of a conductor and that of an insulator, and may be generally described as "semi-conductive" or "static dissipative". The electrostatic dissipative layers have a sheet resistance of between $10^5$ and $10^{11}$ ohms/square, providing a resistance to the slider body (the ground reference) of between $10^6$ and $10^{12}$ ohms. An important aspect of present invention is that static dissipative layers 502, 504, 508, and 510 extend out beyond the nominal location of the ABS by a dimension $D_L$. Dimension $D_L$ is less than the nominal fly height of the head, preferably less than about 5 nanometers, more preferably less than 2 nm, most preferably less than 1 nm. This distance is sufficient to ensure that if contact is made between the head and the media disk surface, the electrostatic dissipative layers make contact with the media surface to drain any built up electrical charge. A plurality of layers is provided for a number of reasons. First, the precise location where the head structure may touch the media surface is indeterminate, and may be dependent on a number of variables such as expansion effects due to heating by the thermal fly height control system, and pitch attitude angle. Secondly, it is desirable to protect both the read structures as well as the write structures from damage. Layers 508 and 510 protect the write head components, whereas layers 504 and 506 protect the MR read sensor 103 and adjoining shield layers 101 and 102. Thirdly, multiple layers need only extend a small distance to minimize $D_L$, whereas a single layer situated between the write structures and the read structures, for example, would need to extend out further from the ABS to assure no contact would be made with any other part of the head. It is desirable to keep $D_L$ at a minimum to avoid any impact on the read or write functions of the head.

Electrostatic dissipative layers 502, 504, 506, 508, and 510 made be made from any material compatible with thin film head manufacturing techniques having the resistivity values mentioned above. Examples of such materials include, but are not limited to, diamond like carbon (DLC), poly-silicon, compounds of Al—N, compounds of Al—Si—N, compounds of Al—O—N, and compounds of Al—O—N—Si. Of the foregoing, DLC is preferred. The extension of the electrostatic dissipative layers from the ABS can be produced with a number of methods. Very hard materials, such as DLC, will tend to extend from the ABS during the lapping steps used to finalize the position of the ABS. This is due to the fact that lapping rates of hard materials such as DLC are much lower than lapping rates of the other layers. Other methods may also be employed such as ion milling, sputtering, wet etching, and dry etching. Each can be chosen to preferentially removed material between the electrostatic dissipative layers subsequent to lapping.

Figure 6:
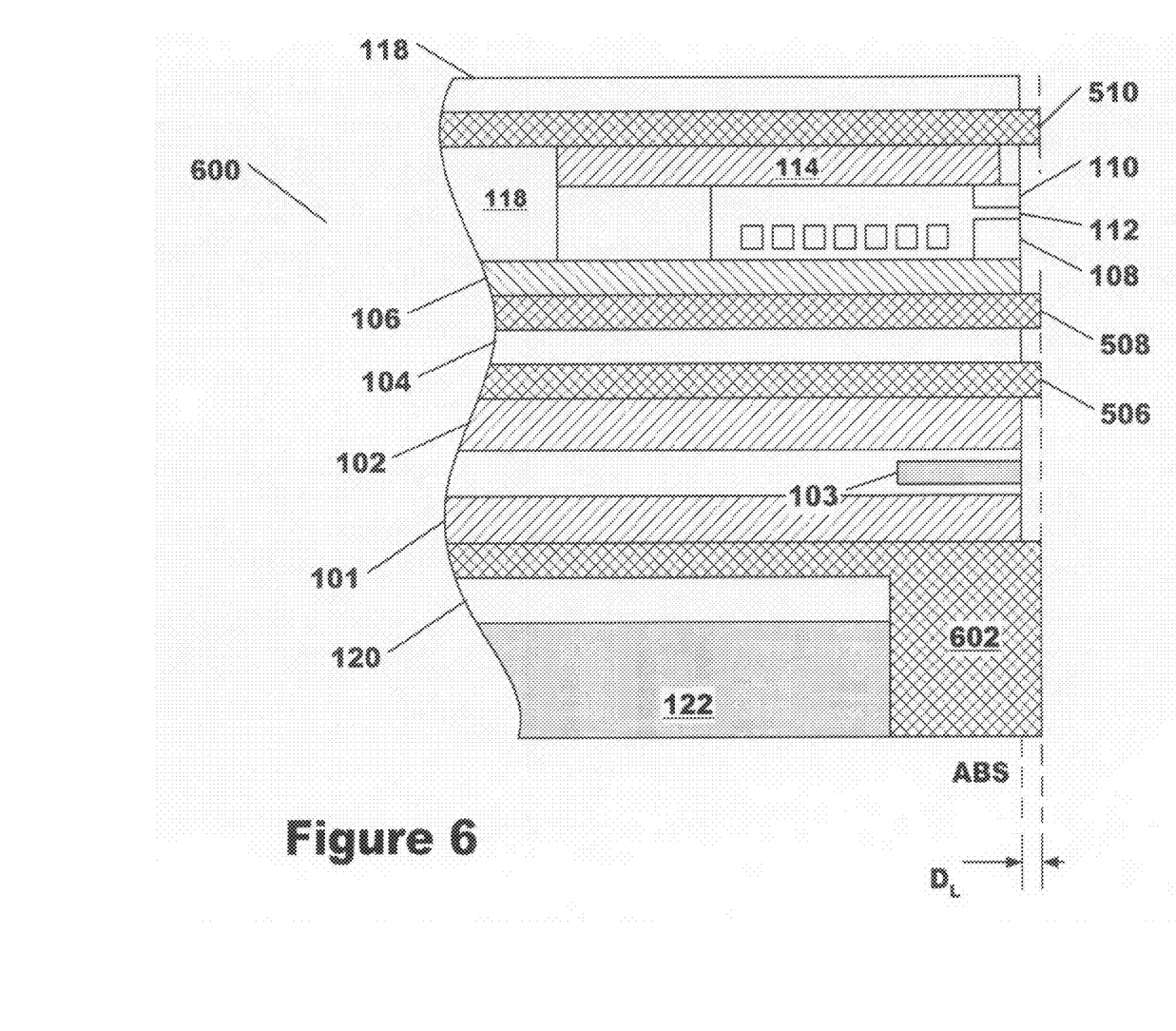

FIG. 6 is a partial, cross section view 600 of a thin film longitudinal head having embedded electrostatic dissipation layers, in accordance with an embodiment of the present invention. In this embodiment, layers 502 and 504 of FIG. 5 have been combined into layer 602 to provide better protection from contact of the slider portion of the head assembly.

Figure 7:
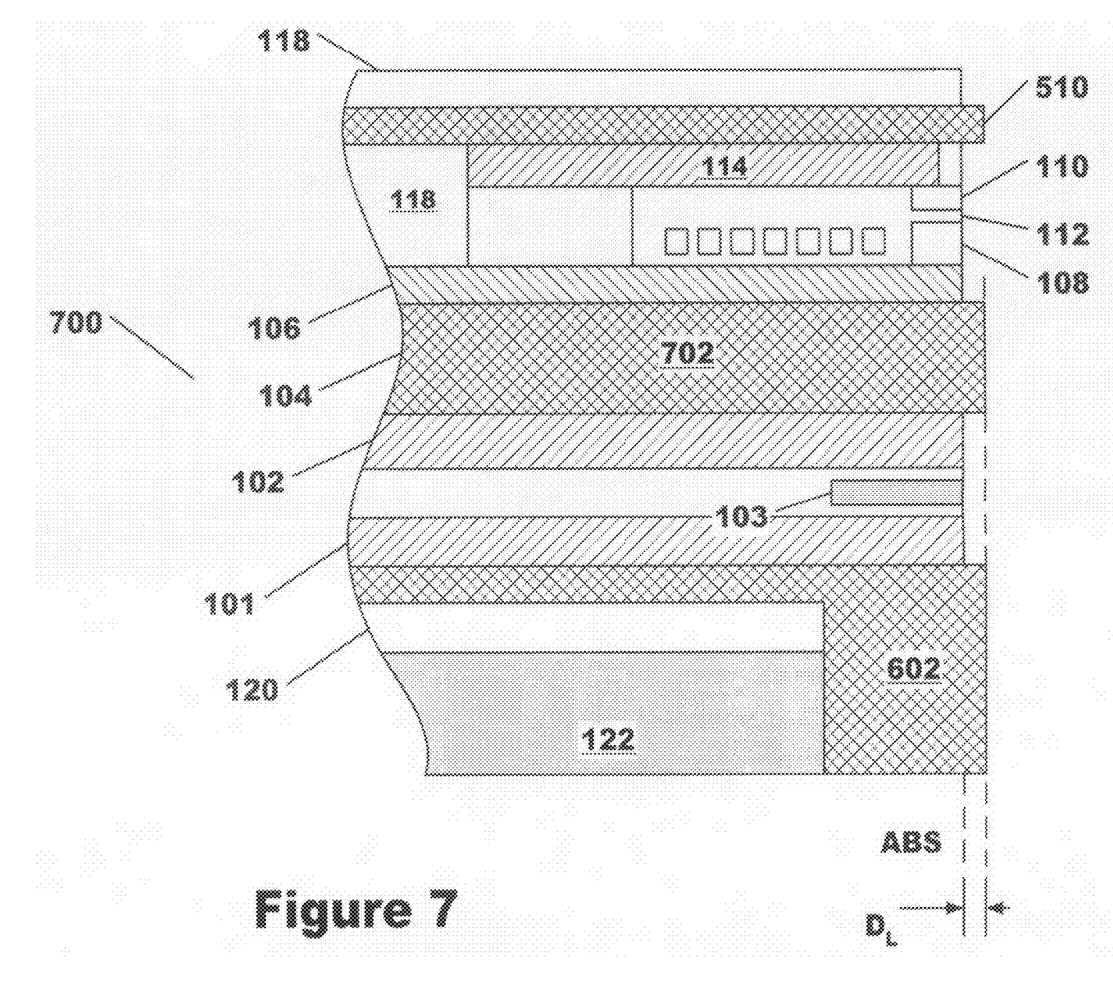

FIG. 7 is a partial, cross section view 700 of a thin film longitudinal head having embedded electrostatic dissipation layers, in accordance with an embodiment of the present invention. In this embodiment, layers 506 and 508 of FIGS. 5, 6 have been combined in layer 702 to simplify the structure, reducing the number of layers. The semi-conductive properties of layer 702 still provides sufficient electrical isolation between the read and write head components.

Figure 8:
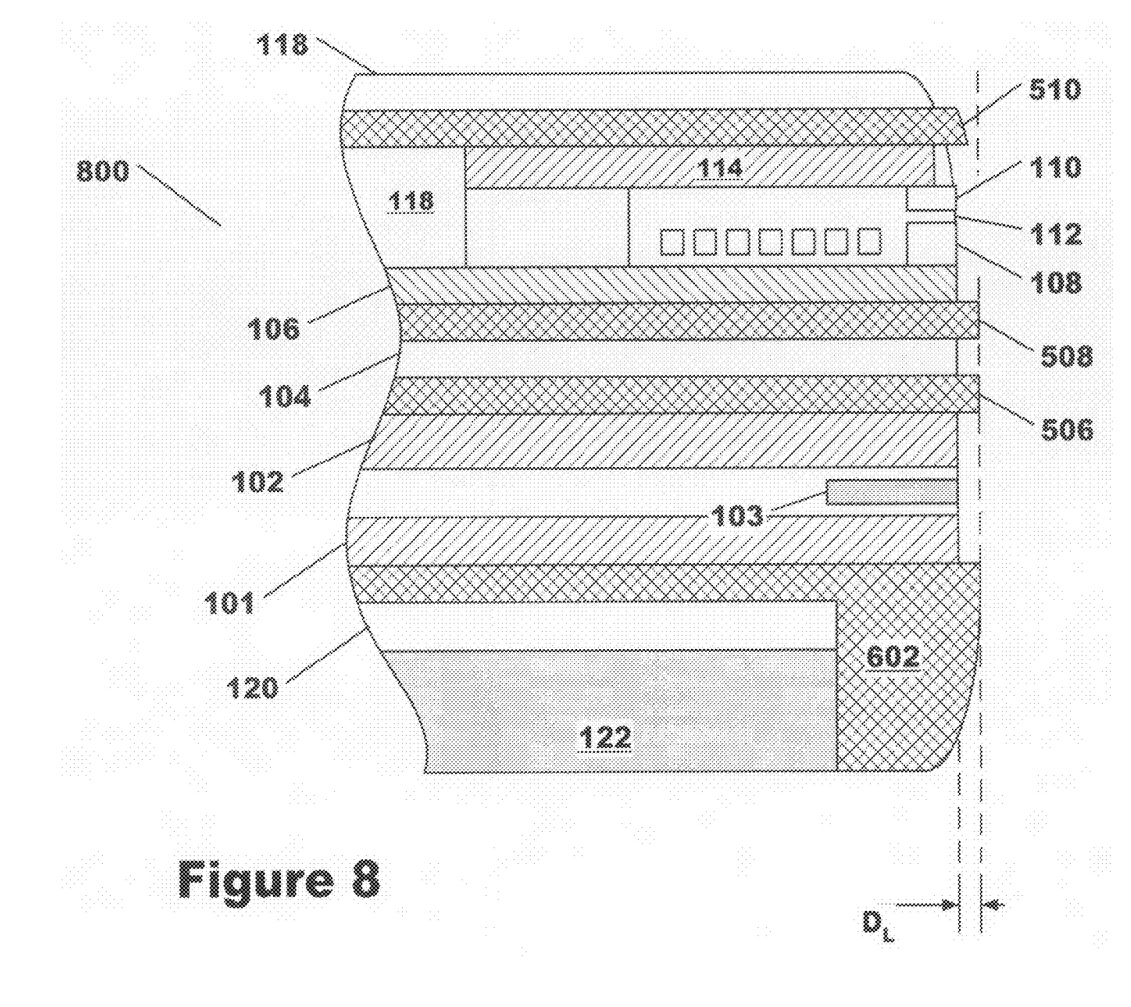
FIG. 8 is a partial cross section view of a thin film longitudinal head having embedded electrostatic dissipation layers, subsequent to heating by a thermal fly height control system, in accordance with an embodiment of the present invention.

FIG. 8 is a partial cross section view 800 of the thin film longitudinal head of FIG. 7, subsequent to heating by a thermal fly height control system (not shown), in accordance with an embodiment of the present invention. The distortion of the head due to thermal expansion effects is shown. Static dissipative layers 602, 506, 508, and 510 extend beyond the nominal position of the ABS by a dimension $D_L$ to protect the read and write head components from electrical discharge damage, should the head touch the media surface (not shown). The probability of such an occurrence is increased when thermal fly height control is used due the tendency to extend the relative position of sensitive read and write head structures toward the media surface, resulting from thermal expansion effects.

Figure 9:
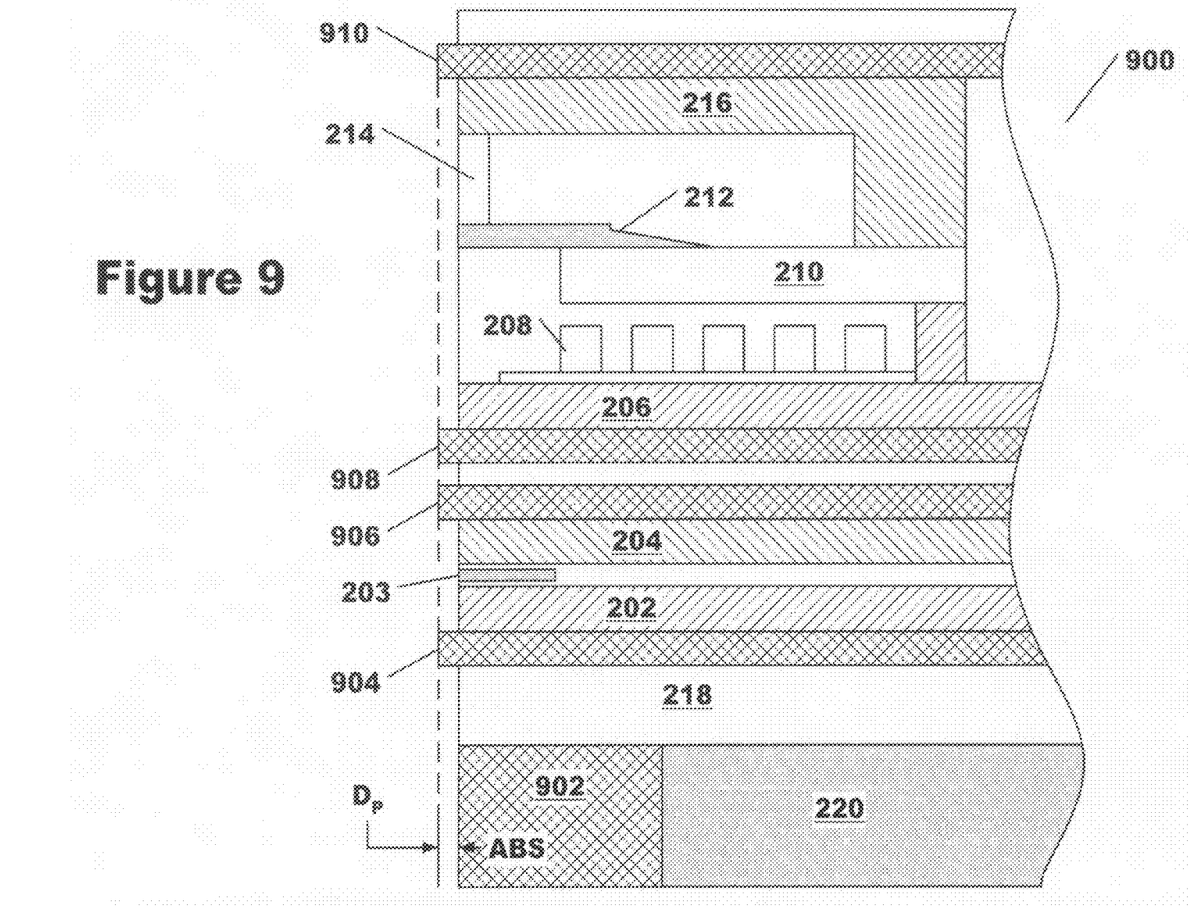
FIGS. 9, 10, and 11 are partial, cross section views of a thin film perpendicular heads having embedded electrostatic dissipation layers, in accordance with embodiments of the present invention; and, FIG. 12 is a partial cross section view of a thin film perpendicular head having embedded electrostatic dissipation layers, subsequent to heating by a thermal fly height control system, in accordance with an embodiment of the present invention.

FIG. 9 is a partial, cross section view 900 of a thin film perpendicular head having embedded electrostatic dissipation layers, in accordance with an embodiment of the present invention. Layers 902, 904, 906, 908, and 910 are electrostatic dissipative layers inserted within the perpendicular head structure to drain electrical charge from the storage media surface (not shown) in a controlled manner. Layers 904 and 906 protect MR read sensor 203 and shield layers 202 and 204. Layers 908 and 910 protect write head components 216, 214, 212, and 206. Layers 904, 906, 908, and 910 extend out from the ABS a dimension $D_P$ as described in the foregoing embodiments of FIGS. 5-8. Layers 902, 904, 906, 908, and 910 have the same material properties and compositions as the static dissipative layers described above. They are also manufactured in a manner similar to that used for longitudinal heads.

Figure 10:
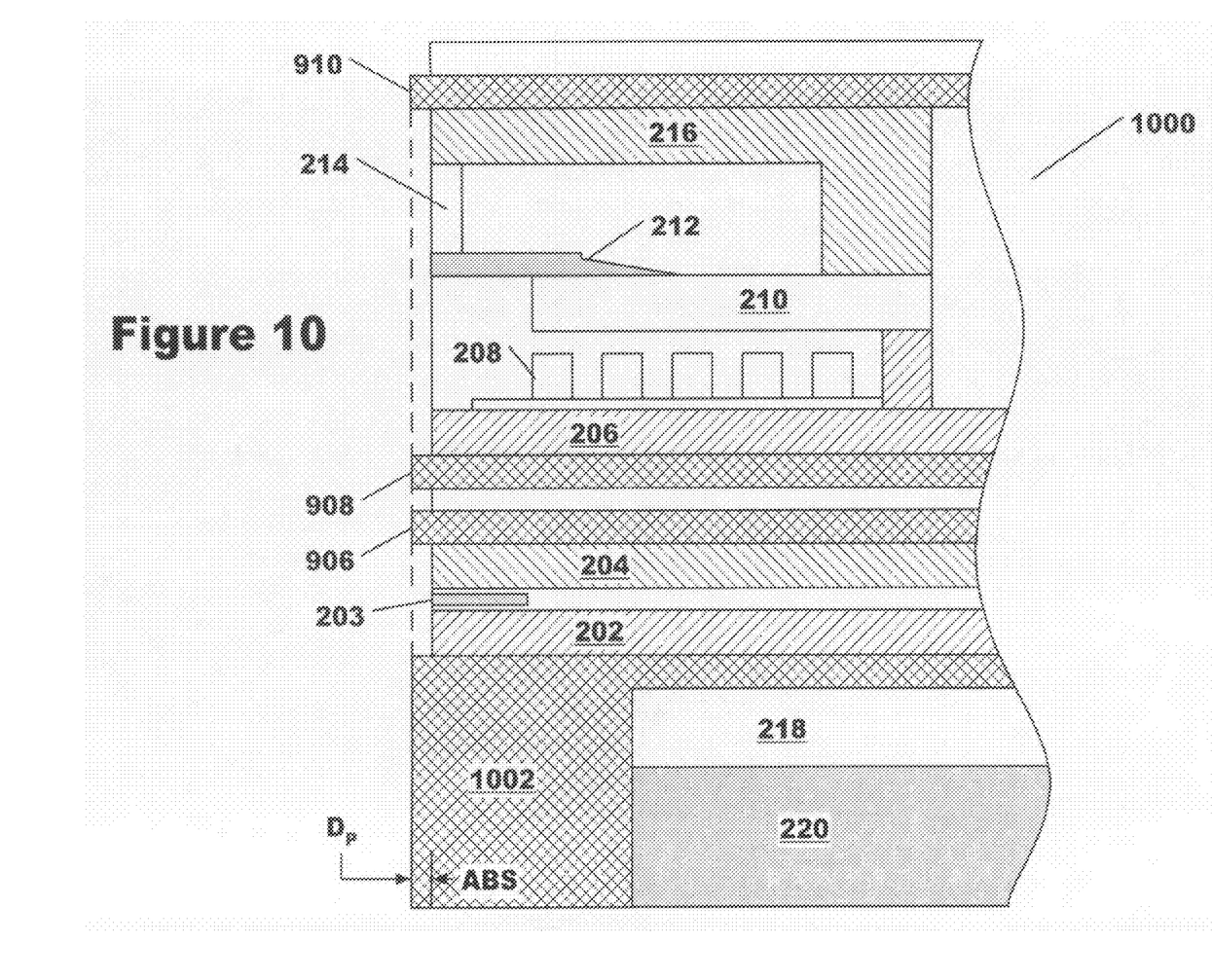

FIG. 10 is a partial, cross section view 1000 of a thin film perpendicular head having embedded electrostatic dissipation layers, in accordance with an embodiment of the present invention. In this embodiment, layers 902 and 904 of FIG. 9 have been combined into layer 1002 to provide better protection from contact of the slider portion of the head assembly.

Figure 11:
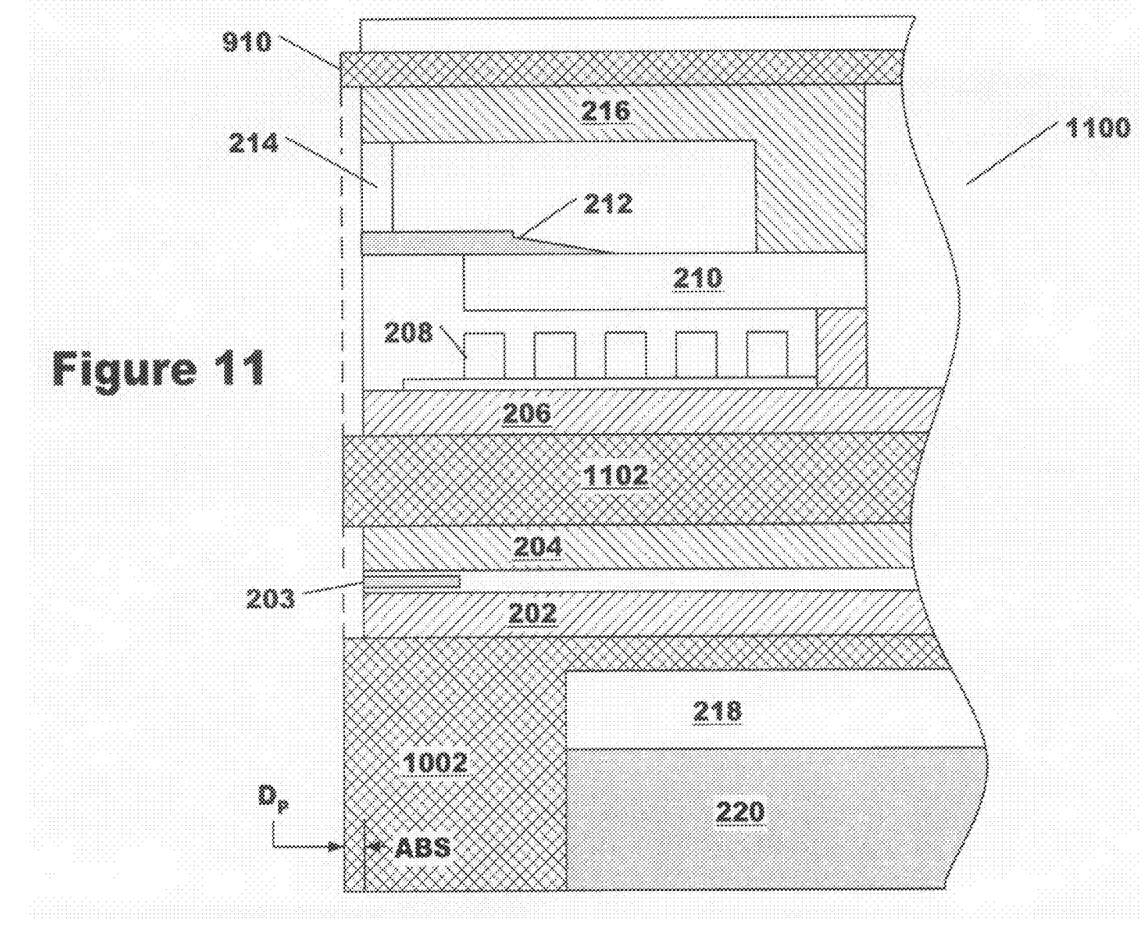

FIG. 11 is a partial, cross section view 1100 of a thin film perpendicular head having embedded electrostatic dissipation layers, in accordance with an embodiment of the present invention. In this embodiment, layers 906 and 908 of FIGS. 9, 10 have been combined in layer 1102 to simplify the structure, reducing the number of layers. The semi-conductive properties of layer 1102 provides sufficient electrical isolation between the read and write head components.

Figure 12:
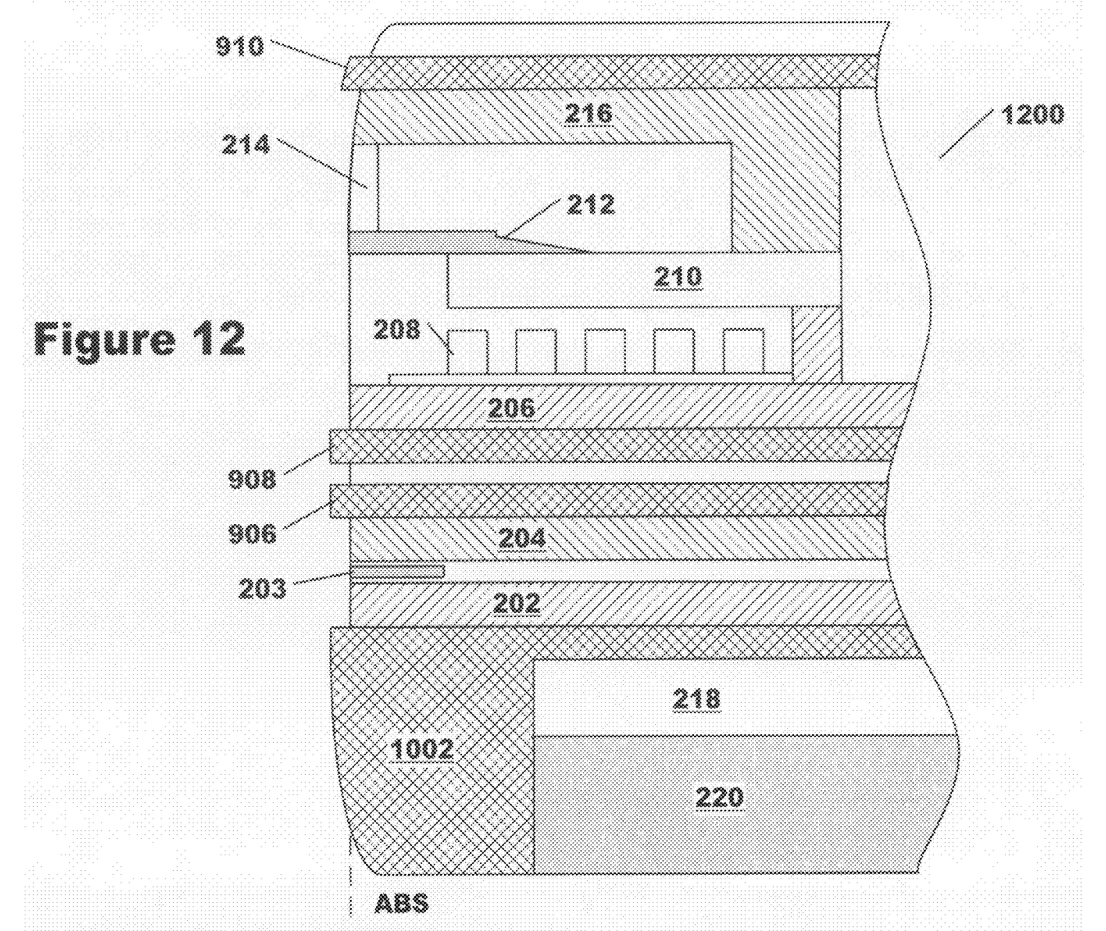

FIG. 12 is a partial cross section view 1200 of the thin film perpendicular head of FIG. 10, subsequent to heating by a thermal fly height control system (not shown), in accordance with an embodiment of the present invention. The distortion of the head due to thermal expansion effects is shown. Static dissipative layers 1002, 906, 908, and 910 extend beyond the nominal position of the ABS by a dimension $D_P$ to protect the read and write head components from electrical discharge damage, should the head touch the media surface (not shown). The probability of such an occurrence is increased when thermal fly height control is used due the tendency to extend the relative position of sensitive read and write head structures toward the media surface, resulting from thermal expansion effects.

The present invention is not limited by the previous embodiments heretofore described. Rather, the scope of the present invention is to be defined by these descriptions taken together with the attached claims and their equivalents.

What is claimed is:

1. A thin film magnetic head comprising:
   a read head structure;
   a write head structure, said read head structure and said write head structure sharing a common air bearing surface;
   a first electrostatic dissipative layer, disposed between said read head structure and said write head structure, a portion of said first electrostatic layer extending beyond said air bearing surface by a distance D, said distance D being between 1 and 5 nm.

2. The magnetic head as recited in claim 1, further comprising a second electrostatic dissipative layer, located such that said read head structure is disposed between said first electrostatic dissipative layer and said second electrostatic dissipative layer, a portion of said second electrostatic layer extending beyond said air bearing surface by said distance D.

3. The magnetic head as recited in claim 2, further comprising a third electrostatic dissipative layer, located such that said write head structure is disposed between said first electrostatic dissipative layer and said third electrostatic dissipative layer, a portion of said third electrostatic layer extending beyond said air bearing surface by said distance D.

4. The magnetic head as recited in claim 3, wherein said first, said second, and said third electrostatic dissipative layers have a sheet resistance between $10^5$ and $10^{11}$ ohms/square.

5. The magnetic head as recited in claim 3, wherein said first, said second, and said third electrostatic dissipative layers comprise diamond like carbon.

6. The magnetic head as recited in claim 3, wherein said first, said second, and said third electrostatic dissipative layers comprise poly-silicon.

7. The magnetic head as recited in claim 1, further comprising a second electrostatic dissipative layer, located such that said write head structure is disposed between said first electrostatic dissipative layer and said second electrostatic dissipative layer, a portion of said second electrostatic layer extending beyond said air bearing surface by said distance D.

8. The magnetic head as recited in claim 7, further comprising a third electrostatic dissipative layer, located such that said read head structure is disposed between said first electrostatic dissipative layer and said third electrostatic dissipative layer, a portion of said third electrostatic layer extending beyond said air bearing surface by said distance D.

9. The magnetic head as recited in claim 8, wherein said first, said second, and said third electrostatic dissipative layers have a sheet resistance between $10^5$ and $10^{11}$ ohms/square.

10. The magnetic head as recited in claim 8, wherein said first, said second, and said third electrostatic dissipative layers comprise diamond like carbon.

11. The magnetic head as recited in claim 8, wherein said first, said second, and said third electrostatic dissipative layers comprise poly-silicon.

12. The magnetic head as recited in claim 1, wherein said write head structure is a perpendicular write head.

13. The magnetic head as recited in claim 1, wherein said write head structure is a longitudinal write head.

14. A thin film magnetic head comprising:
   a read head structure;
   a write head structure, said read head structure and said write head structure sharing a common air bearing surface;
   a first electrostatic dissipative layer, disposed between said read head structure and said write head structure, a portion of said first electrostatic layer extending beyond said air bearing surface by a distance D, said distance D being between 1 and 5 nm;
   a second electrostatic dissipative layer, located such that said read head structure is disposed between said first electrostatic dissipative layer and said second electrostatic dissipative layer, a portion of said second electrostatic layer extending beyond said air bearing surface by said distance D; and,
   a third electrostatic dissipative layer, located such that said write head structure is disposed between said first electrostatic dissipative layer and said third electrostatic dissipative layer, a portion of said third electrostatic layer extending beyond said air bearing surface by said distance D.

15. The magnetic head as recited in claim 14, wherein said first, said second, and said third electrostatic dissipative layers have a sheet resistance between $10^5$ and $10^{11}$ ohms/square.

16. The magnetic head as recited in claim 14, wherein said first, said second, and said third electrostatic dissipative layers comprise diamond like carbon.

17. The magnetic head as recited in claim 14, wherein said first, said second, and said third electrostatic dissipative layers comprise poly-silicon.

18. The magnetic head as recited in claim 14, wherein said write head structure is a perpendicular write head.

19. The magnetic head as recited in claim 1, wherein said write head structure is a longitudinal write head.

* * * * *